United States Patent [19]

Mirza et al.

[11] Patent Number: 5,375,214
[45] Date of Patent: Dec. 20, 1994

[54] SINGLE TRANSLATION MECHANISM FOR VIRTUAL STORAGE DYNAMIC ADDRESS TRANSLATION WITH NON-UNIFORM PAGE SIZES

[75] Inventors: Jamshed H. Mirza, Woodstock, N.Y.; Steven W. White, Austin, Tex.

[73] Assignee: International Business Machines Corporation, Armonk, N.Y.

[21] Appl. No.: 192,768

[22] Filed: Feb. 7, 1994

Related U.S. Application Data

[63] Continuation of Ser. No. 668,642, Mar. 13, 1991, abandoned.

[51] Int. Cl.⁵ .............................................. G06F 12/10
[52] U.S. Cl. ..................................................... 395/400
[58] Field of Search ....................... 395/400, 425; 364/200 MS File, 900 MS File, DIG. 1, DIG. 2

[56] References Cited

U.S. PATENT DOCUMENTS

| | | | |
|---|---|---|---|
| 3,675,215 | 7/1972 | Arnold et al. | 395/425 |
| 4,096,573 | 6/1978 | Heller et al. | 395/425 |
| 4,355,355 | 10/1982 | Butwell et al. | 395/400 |
| 4,356,549 | 10/1982 | Chueh | 395/400 |
| 4,373,179 | 2/1983 | Katsumata | 395/400 |
| 4,766,537 | 8/1988 | Zolnowsky | 395/425 |
| 4,797,814 | 1/1989 | Brenza | 395/425 |
| 4,835,734 | 5/1989 | Kodaira et al. | 395/400 |
| 4,903,234 | 2/1990 | Sakurasa et al. | 365/49 |
| 4,992,936 | 2/1991 | Katada et al. | 395/400 |
| 5,058,003 | 10/1991 | White | 395/400 |
| 5,133,058 | 7/1992 | Jensen | 395/400 |
| 5,263,140 | 11/1993 | Riordan | 395/400 |

FOREIGN PATENT DOCUMENTS

463978 1/1992 European Pat. Off. .

OTHER PUBLICATIONS

Holden et al., "Intergrated Memory Management for the MC68030" IEEE International Conference on Computer Design, 1987 pp. 586–589.

*Primary Examiner*—Jack B. Harvey
*Assistant Examiner*—Jack A. Lane
*Attorney, Agent, or Firm*—Whitham, Curtis, Whitham & McGinn

[57] ABSTRACT

A dynamic address translation mechanism uses a single translation look aside buffer (TLB) facility for pages of various sizes. The single TLB is supported by a small amount of special hardware. This hardware includes logic for detecting a page size prior to translation and generating a mask. The logic selects a set of virtual address bits for addressing the entries in the TLB. Parts of the virtual address are masked and merged with the address read out of the TLB to form the real address.

8 Claims, 5 Drawing Sheets

SINGLE TRANSLATION MECHANISM FOR VIRTUAL STORAGE DYNAMIC ADDRESS TRANSLATION WITH NON-UNIFORM PAGE SIZES

This is a continuation of application Ser. No. 07/668,642 filed Mar. 13, 1991 now abandoned.

CROSS-REFERENCE TO RELATED APPLICATION

This application is related in subject matter to co-pending U.S. patent application Ser. No. 07/285,176 filed Dec. 15, 1988, now U.S. Pat. No. 5,058,003, by Steven W. White for VIRTUAL STORAGE DYNAMIC ADDRESS TRANSLATION MECHANISM FOR MULTIPLE-SIZED PAGES and assigned to the assignee of this application. The subject matter of application Ser. No. 07/285,176 is incorporated herein by reference.

DESCRIPTION

BACKGROUND OF THE INVENTION

1. Field of the Invention

The present invention generally relates to virtual storage mechanisms for data processing systems and, more particularly, to a dynamic address translation (DAT) mechanism which uses a single translation look aside buffer (TLB) facility for pages of various sizes.

2. Description of the Prior Art

Virtual storage organization and management for data processing systems are described, for example, by Harold S. Stone in *High-Performance Computer Architecture*, Addison-Wesley (1987), Harvey M. Deitel in *An Introduction to Operating Systems*, Addison-Wesley (1984), and by Harold Lorin and Harvey M. Deitel in *Operating Systems*, Addison-Wesley (1981). In a virtual storage system, paging is a relocation and address-to-physical-location binding mechanism providing the user of the system with what appear to be considerably larger memory spaces than are really available. The key feature of the virtual storage concept is disassociating the addresses referenced in a running process from the addresses available in main storage. The addresses referenced by the running process are called virtual addresses, while the addresses available in main storage are called real addresses. The virtual addresses must be mapped into real addresses as the process executes, and that is the function of the dynamic address translation (DAT) mechanism. One such mechanism employs a directory look aside table (DLAT), also known in the art as a translation look-aside buffer (TLB), which stores recent virtual address translations. The terms DLAT and TLB are used interchangeably in the art, but for the sake of consistency, the term TLB is adopted in this application. For virtual addresses stored in the TLB, the translation process requires only a couple of machine cycles. For addresses not stored in the TLB, the process may take on the order of ten to one hundred cycles.

In a system which supports multiple page sizes concurrently, if a fixed set of address bits are used to select a congruence class within a TLB, the logical choice of selection bits would be the low-order bits which distinguish between adjacent pages for the largest allowable page size. However, for small pages, such a choice erodes the locality of reference benefits of congruence classes. Consider, for example, the case of a system with 4 KB and 1 MB pages. If the TLB is two-way set associative with 256 pairs of entries, and if the bits which select a 1 MB page are used to select the congruence class, then all 4 KB pages within a 1 MB (aligned) block are mapped to a single congruence class consisting of only two entries. Therefore, at any instant only 8 KB of any 1 MB block (on a 1 MB boundary) can be "covered" by the TLB when the block is backed by 4 KB pages.

To avoid this problem, set-associative designs for address translation can use a distinct TLB facility for each page size. This is the approach taken in the above-referenced application Ser. No. 07/285,176. Rather than using a fixed field of the address to select a TLB congruence class, address bits used to select a congruence class are chosen as a function of the page size associated with the particular TLB. For each TLB, the address is partitioned into a page number field and a displacement (within a page) field. The low-order bits of the page number field are used as congruence class selection bits. Thus, this approach basically selects a different portion of the address to serve as the TLB congruence selection bits by physically (and statically) routing a distinct combination of address bits to each TLB facility.

As the mix of applications often fluctuates (some parts of the day may tend to be predominantly interactive or commercial, while other times may be characterized by scientific/engineering applications), the optimal balance of large pages and small pages varies. The dual TLB approach with the static routing of congruence class selection bits can not easily adapt. The ability to use any available TLB entry to retain translation information without regard for page size will allow adaptation to workload. Therefore, for a given number of total TLB entries, a single TLB could improve TLB hit rates.

Furthermore, some new architectures may allow a large number of page sizes and, in such systems, a distinct TLB for each page size becomes increasingly impractical with an increase in the number of page sizes. The problem of multiple TLBs (one per page size) is further aggravated by the TLB replication used to enhance performance, as in separate TLBs for scalar and vector units as well as independent DAT facilities among processors. Very little experience exists for multiple page size support. Support for several page sizes would allow software performance experimentation without hardware modification.

SUMMARY OF THE INVENTION

It is therefore an object of the present invention to provide a dynamic address translation (DAT) mechanism which uses a single translation look-aside buffer (TLB) facility for pages of various sizes.

It is another object of the invention to provide a single translation-look aside buffer facility storing translation entries for multiple size pages wherein the number of bits in an entry is independent of page size and the number of page sizes supported is such that the ratio of the maximum page size to the minimum page size is less than or equal to a number of translation look-aside buffer congruence classes.

According to the invention, a single TLB is supported by a small amount-of special hardware. This hardware includes logic for detecting a page size prior to translation and generating a mask. The logic selects a set of virtual address bits for addressing the entries in the TLB. Parts of the virtual address are masked and merged with the address read out of the TLB to form the real address.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
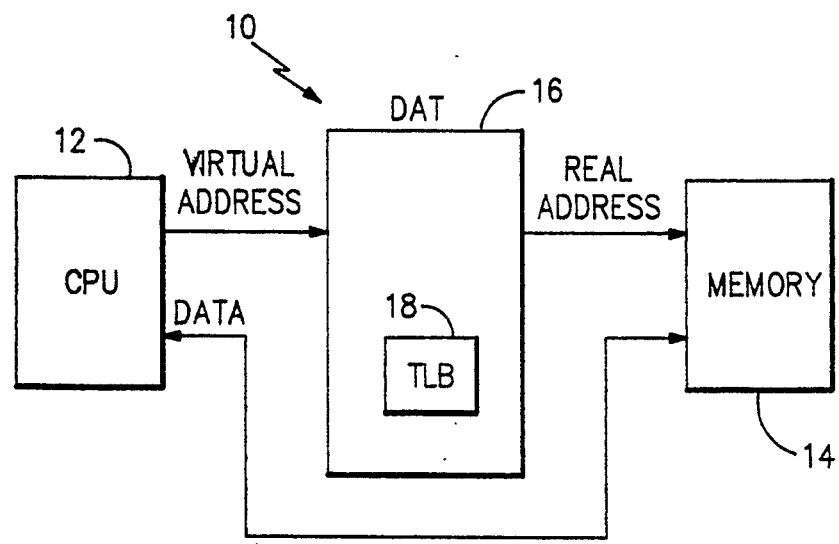
FIG. 1 is a generalized block diagram illustrating a typical data processing system.

Referring now to the drawings, and more particularly to FIG. 1, there is shown a typical data processing system 10 comprising a central processing unit (CPU) 12 which occasionally requires accesses to data elements stored in the physical memory 14. The CPU 12 specifies particular elements using virtual addresses which are mapped to real addresses by the Dynamic Address Translation (DAT) unit 16. To minimize the overhead for maintaining a description of the current mapping, contiguous blocks of virtual memory are mapped to contiguous blocks of real memory. The size of the block is called a "page". A page typically contains one or more records and, for many computers, comprises 4096 bytes, where a byte is the number of bits required to represent a single character (usually 8 bits). However, in the description of the present invention, the term "page" may be any arbitrary block of data. To improve performance, mapping information for recently translated pages is maintained in the DAT unit with a Translation Look-aside Buffer (TLB) 18.

Figure 2A:
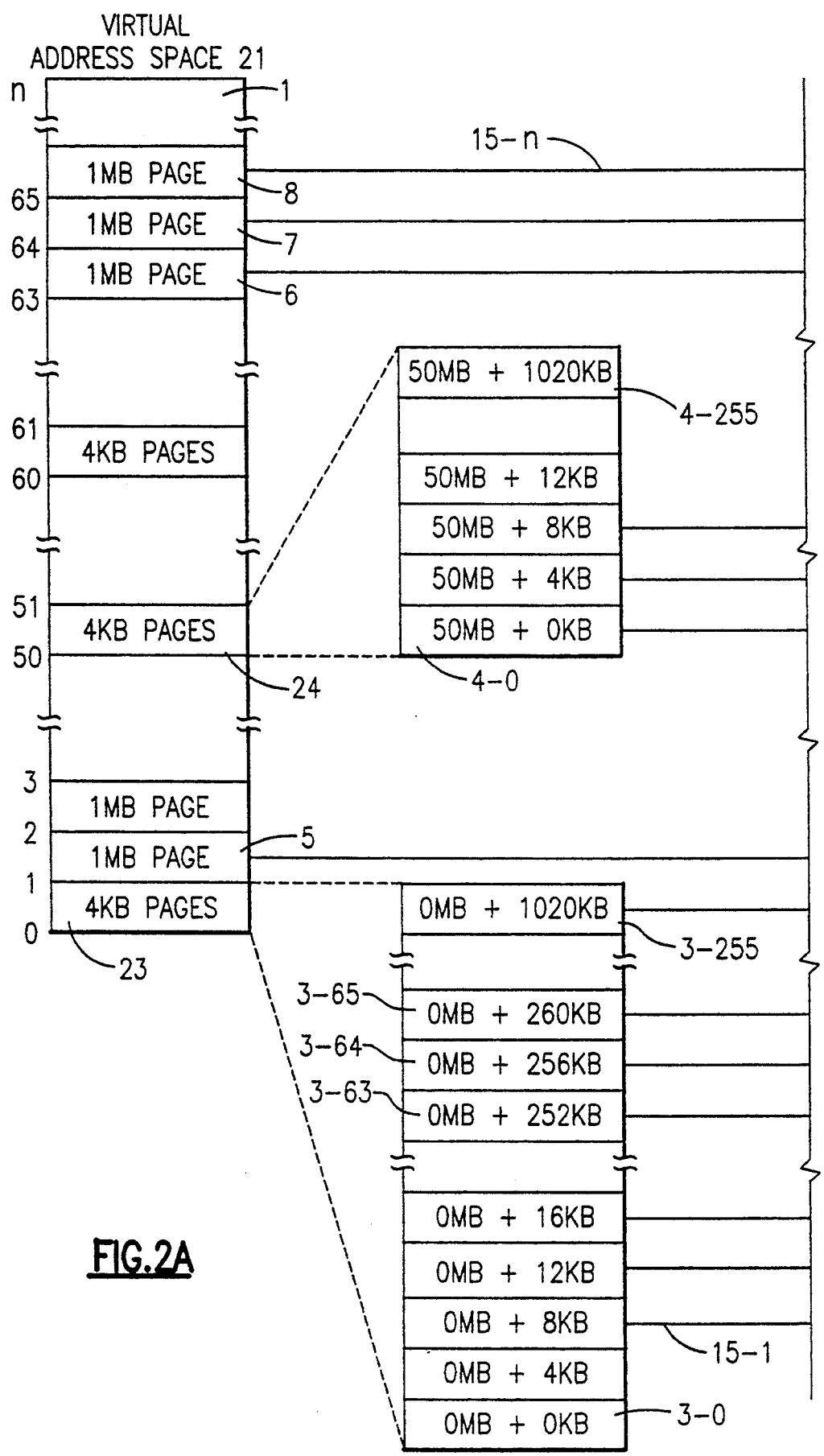
FIGS. 2A and 2B, taken together, diagrammatically illustrate typical translation information which might be present in a system which provides support for non-uniform pages.
Figure 2B:
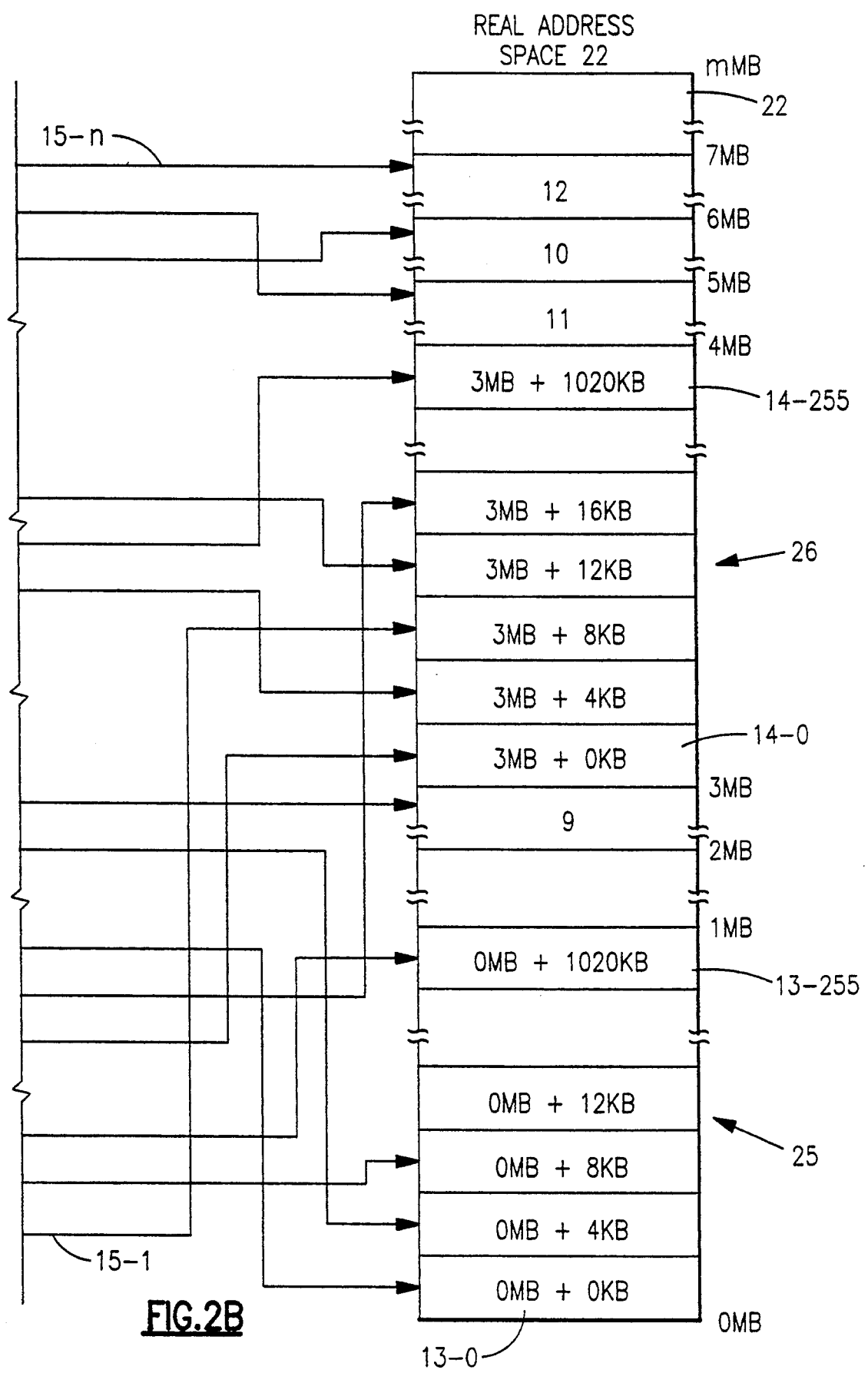

As illustrated in FIGS. 2A and 2B, the virtual address space 21 (FIG. 2A) and the real address space 22 (FIG. 2B) are divided into a number of 1 MB blocks from 0 MB to nMB and 0 MB to mMB, respectively. The virtual space blocks 23 and 24 (FIG. 2A) beginning with 0 MB and 50 MB address values are divided into groups of 256 4 KB pages 3-0 to 3-255 and 4-0 to 4-255. On the other hand, the 1 MB blocks 5-8 with starting virtual addresses of 1 MB, 63 MB, 64 MB, and 65 MB define 1 MB pages in the virtual address space. The blocks 5-8 are mapped into real address blocks 9-12, respectively. Certain of the 4 KB pages in the blocks 23 and 24 are mapped into respective 4 KB page frames 13-0 to 13-255 and 14-0 to 14-255 of real address blocks 25 and 26.

The mapping blocks, or pages, may be of various sizes. Larger blocks allow more "coverage" per TLB entry but incur more overhead for page movement when only small amounts of data are required. Small pages may be effective for small data objects (i.e., code segments, randomly accessed records), while large pages may be more efficient for large contiguous blocks of data such as the arrays which are typical in scientific applications. Requiring that 4 KB pages are on 4 KB boundaries (as is customary) and that 1 MB pages are on 1 MB boundaries allows the most efficient implementation of the translation hardware in the DAT unit.

The design shown is for a two-way set-associative TLB with 256 pairs of entries. Without loss of generalization and for specific purposes of illustration, the invention is described in the context of a system which allows nine page sizes which are powers of two and range from 4 KB to 1 MB inclusive. A specific page size, P, will be denoted as P=0 (4 KB) through P=8 (1 MB).

Figure 3:
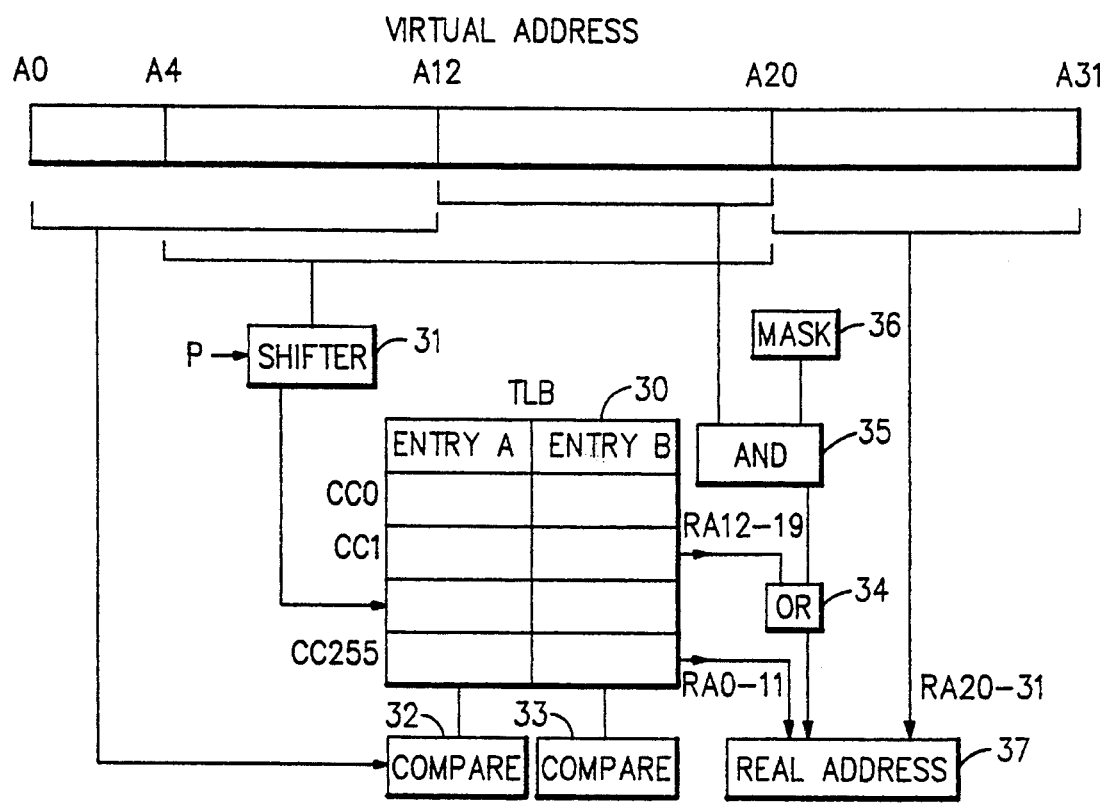
FIG. 3 is a block diagram illustrating the logical organization of the address translation unit according to the invention.

Shown in FIG. 3 is the TLB 30 and its associated routing circuitry. Each TLB entry consists of a 12-bit tag value and a 20-bit "real address" field. The congruence class selection is based on a 8-bit (256 pairs of entries) field. For 4 KB pages, it would be A12-A19, and for 1 MB pages, it would be A4-A11. This "sliding window" of address bits can be implemented as a shifter 31 which inputs A4-A19, shifts right P bits, and outputs the low-order eight bits. FIG. 3 shows the output of the shifter 31 being used to select a pair of TLB entries.

Once a pair of entries has been selected, the tag value of each entry is compared in comparators 32 and 33 against A0-A11. If there is no match, a TLB miss has occurred. On a TLB miss, address translation is obtained (through a segment/page table search or page fault) and placed in a TLB entry. If there is a match, the associated real address field (RA12-RA19) is gated to the OR gates 34. The other input to the OR gates 34 is a masked set of virtual address bits (A12-A19) from AND gates 35. The 8-bit mask 36 consists of (8-P) zeroes followed by P ones. The twelve high-order address bits (RAC-RA11) from the TLB are passed through to the real address register 37 untouched.

From the four bits (P3-P0) which specify a value of P, it can be seen that the generation of the 8-bit mask is trivial. The process is illustrated as follows:

$$M0 = P3 + P2 + P1 + P0$$
$$M1 = P3 + P2 + P1$$
$$M2 = P3 + P2 + P1 \cdot P0$$
$$M3 = P3 + P2$$
$$\cdot$$
$$\cdot$$
$$M7 = P3$$

Clearly, the mask generation, the masking of A12-A19 (by AND gates 35), and the OR gates 34 can be combined into a single block of combinational logic.

The key to simplification of this design is being able to create uniform TLB entries which are essentially independent of page size. This is managed in two steps. First, redundant information is included in the tag field of each entry. For 4 KB pages, unique tags would be 20 bits, A0-A19. However, since 4 KB pages would normally use A12-A19 as congruence class selection bits, the value of these bits are known once the pair of entries has been selected. Therefore, only A0-A11 need be saved as a tag. Similar logic would dictate that only A0-A3 need be saved as the tag for 1 MB pages. However, in the design illustrated, bits A4–A11 are also retained even though they are redundant. Doing so allows the comparators 32 and 33 to be independent of page size (all tags and comparators use A0–A11). Since the tag bits used in the "match" comparison can not include any of the bits which select a byte within the largest page, the number of congruence classes must be greater than or equal to the ratio of the large page size to the small page size (in bytes). Likewise, padding of the real address field allows the real address generation logic to be independent of page size. For 1 MB pages, only 12 bits (RA0–RA11) need be maintained. In this design, P zeroes are used to pad the low-order bits. No TLB space is wasted (for the redundant P bits in the tag and P padded bits in the real address) in the sense that these bits are used when the entry is for a small page.

Figure 4:
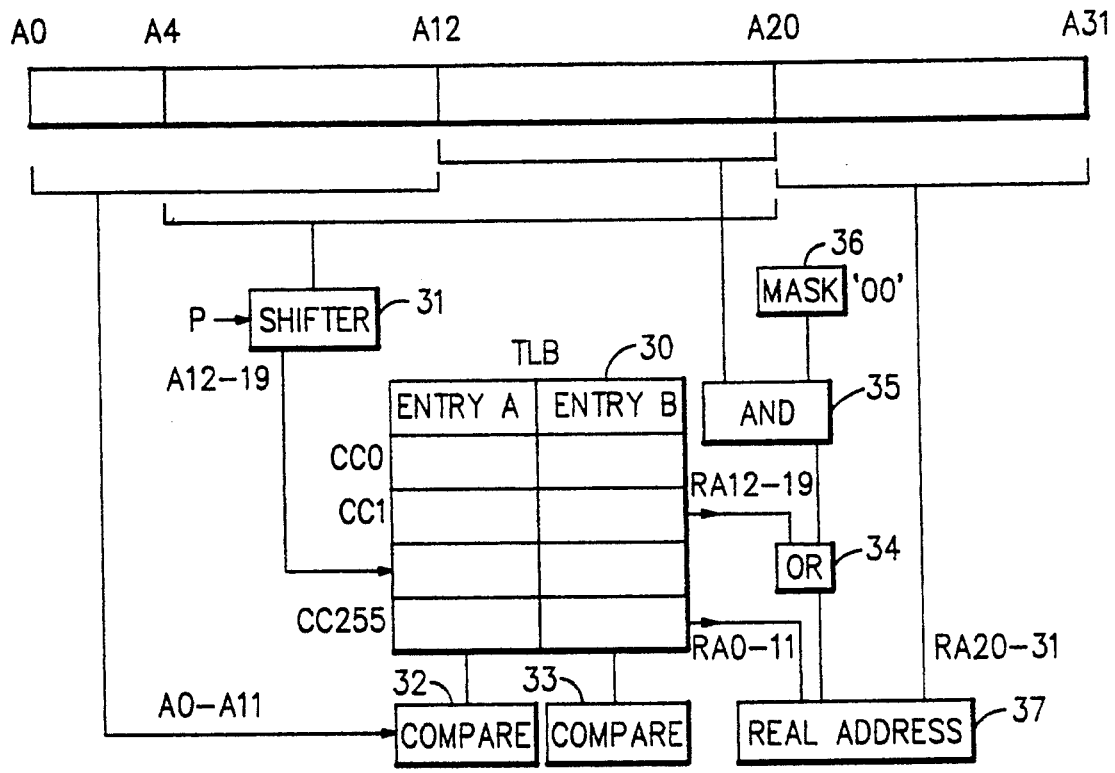
FIG. 4 is a block diagram which illustrates a logical view of the translation unit when translating a 4 KB page.
Figure 5:
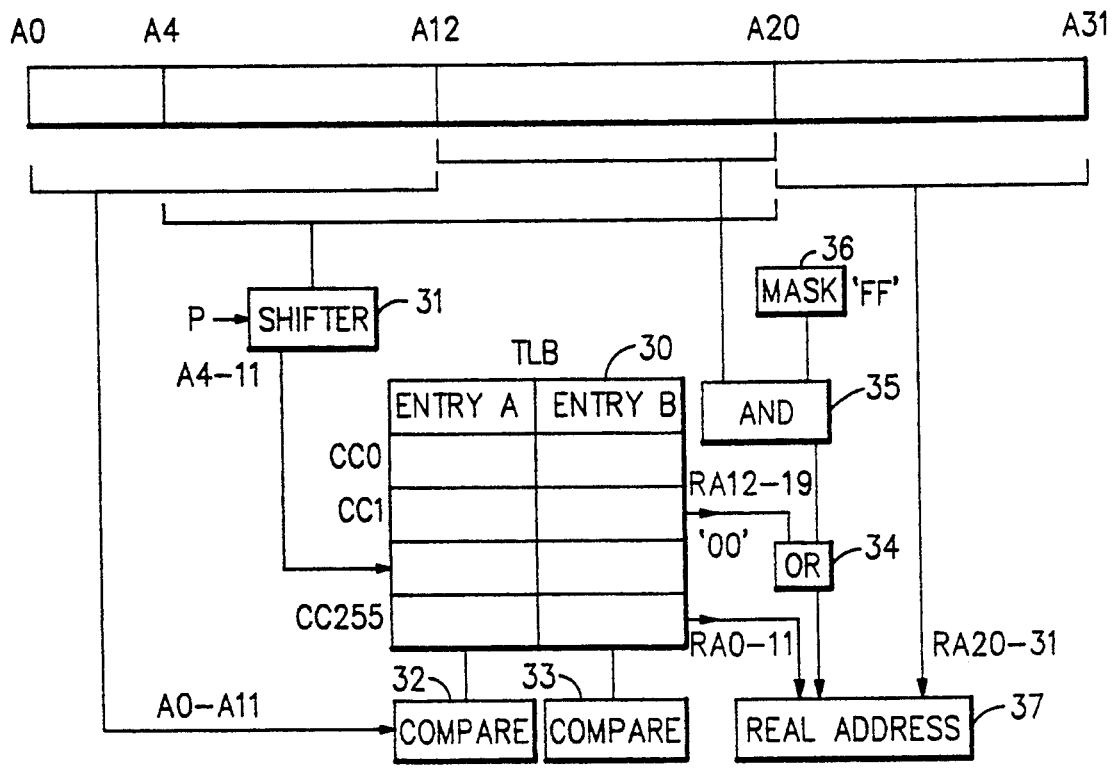
FIG. 5 is a block diagram which illustrates a logical view of the translation unit when translating a 1 MB page.

During translation of a 4 KB page (P=0), the grouping and routing of the various bit fields is as shown in FIG. 4. During translation of a 1 MB page (P=8), the grouping and routing of the various bit fields is as shown in FIG. 5. In FIGS. 4 and 5 like reference numerals denote identically the same structure as in FIG. 3. It will be noted that for P=0, the shifter 31 outputs virtual address bits A12–A19 (FIG. 4), while for P=8, the shifter 31 outputs virtual address bits A4–A11 (FIG. 5). Similarly, the mask 36 is HEX "00" for P=0, but is HEX "FF" for P=8.

Figure 6:
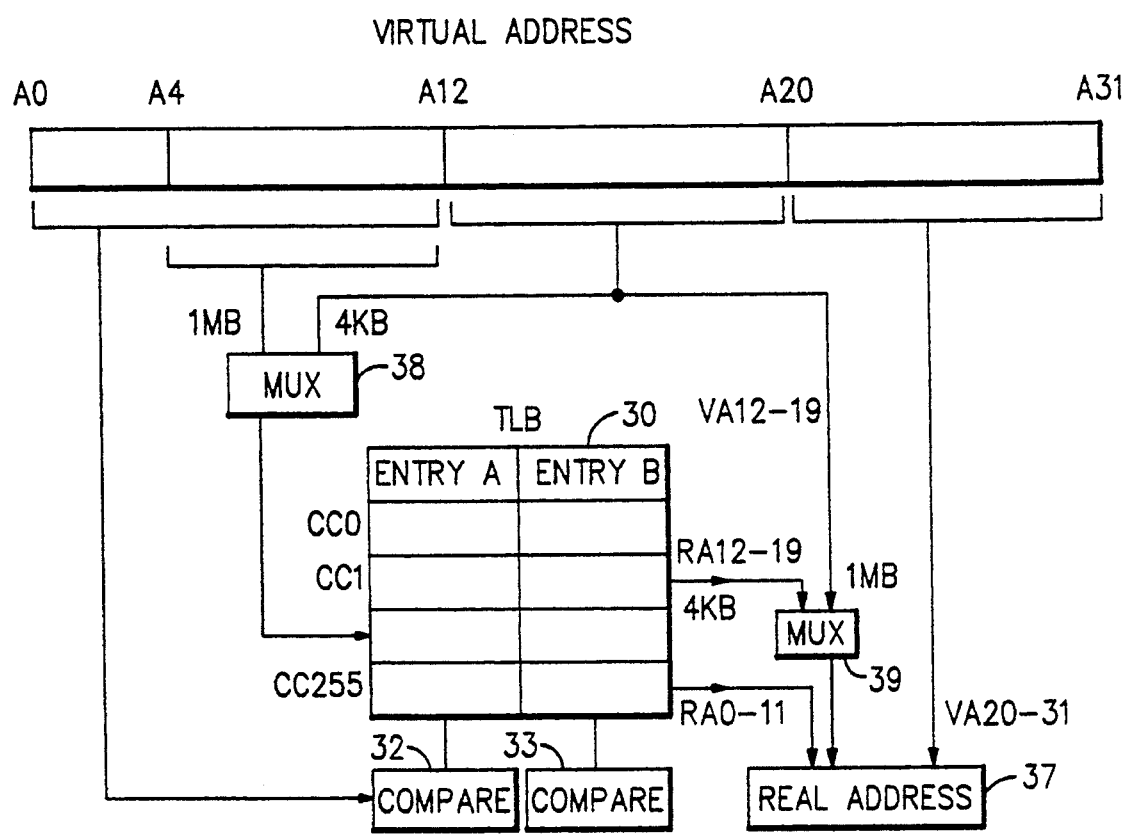
FIG. 6 is a block diagram illustrating the logical organization of the simplified address translation unit according to this invention.

The illustrative embodiment supports nine page sizes (0 to 8). Simplification results if fewer number of page sizes are allowed. As an example, as shown in FIG. 6, if only two page sizes are used, say 4 KB and 1 MB, the congruence class shifter 31 of FIG. 3 becomes a simple 8-bit two-way multiplexer 38 and the mask generator 36, the AND gates 35 and the OR gates 34 of FIG. 3 reduce to a single 8-bit two-way multiplexer 39.

Current schemes do not need to know the page size for the address being translated prior to presentation since they require conditions under which multiple TLB hits (for a single translation) can not occur. One restriction for the present invention is that the page size is required prior to presentation to the translation unit. One architecture which can be used to illustrate an example of determining page size prior to translation is the IBM ESA/370 system which supports a 4 KB page size and multiple address spaces for a single user. If multiple page sizes were to be incorporated, by requiring a uniform page size within each address space (but not across address spaces), the page size information could be maintained in the look-aside buffer for the access register information. Associated with the contents of an access register is information for identifying a particular address space, and in this case, the page size for that space.

In systems with a logically two-level translation, such as the IBM RISC System/6000, it is possible to determine page size prior to the virtual-to-real address translation. One choice is to require uniform page size within a segment. During the effective-to-virtual translation, the page size can be determined and the page size information can be maintained with the other segment (register) information which can be logically kept in a Segment Look-aside Buffer (SLB). The SLB can keep recently translated effective-to-virtual information in the same manner a TLB keeps recent virtual-to-real translation information.

Maintaining redundant information and padding with zeroes aids in minimizing the circuitry required to support multiple page sizes in a single TLB. For a given number of TLB entries, a single TLB provides greater hit ratios than multiple TLBs. Furthermore, since TLBs do not necessarily conform to integrated circuit (IC) chip capacities, some wasted real estate may occur for each TLB. Thus, combining TLBs can reduce the percentage of wasted chip area.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An address translation mechanism for a virtual storage system in a data processing system which supports multiple size pages comprising:
    means for storing a virtual address to be translated to a real address in storage;
    a single set associative translation look-aside buffer facility storing translation entries for said multiple size pages, a number of bits in an entry of said translation look-aside buffer being unrelated page size, a number of page sizes supported by said address translation mechanism being such that a ratio of a maximum size of said multiple size pages to a minimum size of said multiple size pages is less than or equal to a number of translation look-aside buffer congruence classes, said single set associative translation look-aside buffer including means for supporting multiple size pages simultaneously;
    logic means for selecting a first subset of virtual address bits for addressing the translation entries in said translation look-aside buffer and for selecting a second subset of said virtual address bits; and
    means for merging the second subset of virtual address bits with an address read out of the translation look-aside buffer to form a portion of a real address.

2. The address translation mechanism as recited in claim 1 wherein said logic means includes mask generation means for generating a mask in accordance with respective ones of said multiple page sizes prior to translation, said logic means masking a subset of said virtual address bits.

3. The address translation mechanism as recited in claim 2 wherein said logic means further includes shifter means for shifting a portion of said virtual address to generate said first subset.

4. The address translation mechanism as recited in claim 3 wherein each translation look-aside buffer entry includes a 12-bit tag value and a 20-bit real address field and said multiple size pages range from 4 KB to 1 MB in size specified by a 4-bit page size code.

5. The address translation mechanism as recited in claim 4 wherein said mask generation means generates said mask in accordance with said 4-bit page size code, and said 4-bit page size code controls said shifter means for shifting said portion of said virtual address to generate said first subset of virtual address bits for addressing the translation entries in said translation look aside buffer.

6. The address translation mechanism as recited in claim 1 wherein said data processing system supports two pages sizes and said logic means comprises:
    first multiplexer means for selecting either said first subset or said second subset of virtual address bits for addressing the translation entries in said translation look-aside buffer; and second multiplexer means for selecting either a first portion of an address read out of said translation look-aside buffer or said second subset of virtual address bits for merging with a second portion of said address read out of said translation look-aside buffer.

7. The address translation mechanism as recited in claim 1 wherein said single translation look-aside buffer comprises a single two-way set associative translation look-aside buffer.

8. The address translation mechanism as recited in claim 1 wherein said logic means includes means for selecting and comparing said translation entries in said translation look-aside buffer such that address translation by said address translation mechanism is conducted in a single comparison step of said translation entries.

* * * * *